(12) United States Patent
Motey

(10) Patent No.: US 11,519,311 B1
(45) Date of Patent: Dec. 6, 2022

(54) TECHNIQUES TO SYNTHESIZE GREENHOUSE GASES

(71) Applicant: Alexander Kian Motey, Los Altos, CA (US)

(72) Inventor: Alexander Kian Motey, Los Altos, CA (US)

( * ) Notice: Subject to any disclaimer, the term of this patent is extended or adjusted under 35 U.S.C. 154(b) by 0 days.

(21) Appl. No.: 17/746,369

(22) Filed: May 17, 2022

Related U.S. Application Data

(63) Continuation-in-part of application No. 17/555,465, filed on Dec. 19, 2021, now Pat. No. 11,473,463.

(60) Provisional application No. 63/264,368, filed on Nov. 21, 2021, provisional application No. 63/237,461, filed on Aug. 26, 2021, provisional application No.
(Continued)

(51) Int. Cl.
| | |
|---|---|
| *F01N 3/022* | (2006.01) |
| *F01N 13/08* | (2010.01) |
| *F01N 3/08* | (2006.01) |
| *F01N 3/28* | (2006.01) |
| *B01D 53/04* | (2006.01) |
| *C25B 3/07* | (2021.01) |
| *C25B 3/26* | (2021.01) |
| *C25B 3/03* | (2021.01) |

(52) U.S. Cl.
CPC ....... *F01N 3/0222* (2013.01); *B01D 53/0407* (2013.01); *C25B 3/03* (2021.01); *C25B 3/07* (2021.01); *C25B 3/26* (2021.01); *F01N 3/0857* (2013.01); *F01N 3/2882* (2013.01); *F01N 13/082* (2013.01); *B01D 2253/108* (2013.01); *B01D 2253/204* (2013.01); *B01D 2253/304* (2013.01); *B01D 2253/3425* (2013.01); *B01D 2257/502* (2013.01); *F01N 2370/04* (2013.01); *F01N 2570/10* (2013.01)

(58) Field of Classification Search
CPC .... F01N 3/0222; F01N 3/0857; F01N 3/2882; F01N 13/082; F01N 2370/04; F01N 2570/10; B01D 53/0407; B01D 2253/108; B01D 2253/204; B01D 2253/304; B01D 2253/3425; B01D 2257/502; C25B 3/03; C25B 3/07; C25B 3/26
See application file for complete search history.

(56) References Cited

U.S. PATENT DOCUMENTS

| | | | |
|---|---|---|---|
| 7,278,259 B2 | 10/2007 | Schmeichel et al. | |
| 7,785,544 B2 | 8/2010 | Alward et al. | |
(Continued)

FOREIGN PATENT DOCUMENTS

| | | | | |
|---|---|---|---|---|
| BR | PI0804707 A2 | * | 5/2011 | |
| CN | 112648047 A | * | 4/2021 | ......... B01D 53/0407 |
(Continued)

OTHER PUBLICATIONS

"Scientists Accidentally Turned CO2 Into Ethanol." Oct. 21, 2016. Retrieved from https://www.energy.gov/articles/scientists-accidentally-turned-co2-ethanol.*

*Primary Examiner* — Mickey H France
(74) *Attorney, Agent, or Firm* — Clause Eight; Michael Catania

(57) ABSTRACT

An apparatus for attachment to a tailpipe of a vehicle is disclosed herein. The apparatus includes a filter body, a honeycomb monolith, a locking collar and a removable front cover. The honeycomb monolith is composed of an adsorbent material or an absorbent material. Exhaust from the tailpipe of the vehicle is absorbed by the honeycomb monolith structure.

2 Claims, 15 Drawing Sheets

Related U.S. Application Data

63/229,952, filed on Aug. 5, 2021, provisional application No. 63/187,876, filed on May 12, 2021, provisional application No. 63/135,850, filed on Jan. 11, 2021.

(56) References Cited

U.S. PATENT DOCUMENTS

| | | | |
|---|---|---|---|
| 8,359,829 B1 * | 1/2013 | Ramberg | F02D 41/1453 60/285 |
| 9,486,733 B2 | 11/2016 | Hamad | |
| 10,823,024 B2 | 11/2020 | Chidubem et al. | |
| 2010/0251937 A1 * | 10/2010 | Murray | B01D 53/0407 60/272 |
| 2013/0186075 A1 * | 7/2013 | Myers | B01D 53/92 60/320 |
| 2013/0298532 A1 * | 11/2013 | Hamad | B01D 53/62 60/274 |
| 2013/0298761 A1 * | 11/2013 | Hamad | B01D 53/1493 96/242 |
| 2014/0099245 A1 * | 4/2014 | Hamad | B01D 53/92 96/242 |
| 2015/0183314 A1 * | 7/2015 | De Luca | B60K 13/04 180/309 |
| 2019/0170046 A1 | 6/2019 | Hamad et al. | |
| 2021/0053011 A1 * | 2/2021 | Sugiyama | F01N 3/24 |
| 2021/0062697 A1 * | 3/2021 | Yokoyama | F01N 3/206 |

FOREIGN PATENT DOCUMENTS

| | | |
|---|---|---|
| DE | 102020118917 | 1/2022 |
| EP | 2962744 | 11/2019 |

* cited by examiner

TECHNIQUES TO SYNTHESIZE GREENHOUSE GASES

CROSS REFERENCES TO RELATED APPLICATIONS

The Present Application is a continuation-in-part application of U.S. patent application Ser. No. 17/555,465, filed on Dec. 19, 2021, which claims priority to U.S. Provisional Patent Application No. 63/135,850, filed on Jan. 11, 2021, U.S. Provisional Patent Application No. 63/187,876, filed on May 12, 2021, U.S. Provisional Patent Application No. 63/229,952, filed on Aug. 5, 2021, U.S. Provisional Patent Application No. 63/237,461, filed on Aug. 26, 2021, U.S. Provisional Patent Application No. 63/264,368, filed on Nov. 21, 2021, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to vehicle tail pipe filter, and more specifically to vehicle tail pipe filters for capture of greenhouse gas emissions.

Description of the Related Art

Light-duty gasoline powered vehicles have been deployed everywhere for people to travel day by day to: complete their chores, get to and from work, and engage in personal activities. It has greatly enabled individual productivity from when the idea was first patented in 1886. This activity has also created a consequence of emitting greenhouse gases into Earth's atmosphere. Now, it is 2021 and our world is resolving what has become the climate crisis, where we have come together to reduce individual, corporate, and governmental greenhouse gas emissions to zero. Civilization has been able to thus far properly address reductions of greenhouse gas emissions from the production of: electricity, chemical reactions to produce goods from raw materials, energy, businesses and homes, maintenance of livestock, and usage of cars, trucks, planes, trains and ships. While our world has actively engaged itself to reduce emissions in all of these sectors through electrification, there seems to be one vital sector that is being left behind: further reduction of emissions from existing gasoline engaged light-duty vehicles.

The light-duty vehicle industry has actively sought to reduce its greenhouse gas emissions for decades. Research and development investments have gone into making an Earth friendly light-duty vehicle, such as improving the catalytic converter, replacing the internal combustion engine system with an electric system, or adding an electric based engine to the gasoline powered vehicle propulsion process. Gasoline-powered vehicles still produce significant emissions; and even if a more efficient catalytic converter or energy reducing engine system is created or improved, it won't be affordable to most people that currently own and operate a functioning gasoline powered vehicle, especially in regions where electric vehicle adoption rates are concerningly underwhelming.

As the vastly anticipated electrification of the light-duty vehicle industry is under way, major car companies have committed hundreds of billions of dollars thus far to electrify the world vehicle fleet. Currently, an estimated 1.2 billion cars on our roads are powered by fossil fuels. It is disastrously anticipated that still, new models in future years will still consume fossil fuels and produce greenhouse gas emissions.

Onboard carbon capture technology has become feasible for large internal combustion engines in industries such as maritime transport and heavy duty trucking. Attempts to capture carbon dioxide from the tailpipes of light-duty vehicles have been attempted before, but onboard conversion caused the entire process to be environmentally uneconomical. By capturing emissions and converting the emissions using a conversion device unattached to the light duty vehicle, the environmental economics become feasible.

BRIEF SUMMARY OF THE INVENTION

The present invention provides a novel solution to removing exhaust from the gas-powered vehicles that are still used by the vast majority of drivers.

In one aspect of the present invention, zeolitic imidazole frameworks, zeolites, metal organic frameworks (MOFs), other hybrid ultraporous materials, membranes, adsorption focused materials, other natural sorbents or adsorbents is molded into a honeycomb monolith and placed inside of a filter apparatus that shrinks the exit area of exhaust gases from vehicle tailpipes.

Another aspect of the present invention is an apparatus for attachment to a tailpipe of a vehicle. The apparatus comprises a filter body, a honeycomb structure and a locking collar. The filter body comprises a front flange with an aperture and an elongated section configured for insertion into the tailpipe. The filter body has a length ranging from 1 to 30 inches, and a diameter of 1 to 5 inches. The honeycomb structure is placed within the elongated section of the filter body. The honeycomb structure comprises a plurality of spherical sorbents in a stacked steady state. The locking collar is configured for placement on an exterior of the tailpipe. The filter body is secured to the tailpipe by connection of the front flange to the locking collar. Exhaust from a tailpipe is absorbed by the plurality of spherical sorbents within the honeycomb structure. A mass of the apparatus ranges from 1 to 25 pounds.

Preferably, each of the honeycomb cells of the honeycomb structure is larger than a spherical sorbent of the plurality of spherical sorbents to provide for insertion and removal from each of the honeycomb cells.

Yet another aspect of the present invention is an apparatus with a honeycomb structure for attachment to a tailpipe of a vehicle. The apparatus comprises a filter body comprising a front section with an aperture, an elongated section configured for insertion into the tailpipe, and a honeycomb structure within the elongated section of the filter body. The filter body has a length ranging from 1 to 30 inches, and a diameter of 1 to 5 inches. A plurality of spherical sorbents placed within the honeycomb structure in a stacked steady state. The filter body is secured to the tailpipe by connection of the front section to the collar. Exhaust from a tailpipe is absorbed or adsorbed by the plurality of spherical sorbents. A mass of the apparatus ranging from 1 to 25 pound.

Yet another aspect of the present invention is an apparatus for attachment to a tailpipe of a vehicle. The apparatus comprises a filter body, a honeycomb structure, and a locking collar. The filter body comprises a front flange with an aperture and an elongated section configured for insertion into the tailpipe. The filter body has a length ranging from 1 to 30 inches, and a diameter of 1 to 5 inches. The honeycomb structure is placed within (preferably removably) the elongated section of the filter bod. The honeycomb structure is composed of an adsorbent material or an absorbent material. The locking collar is configured for placement on an exterior of the tailpipe. The filter body is secured to the tailpipe by connection of the front flange to the locking collar. Exhaust from a tailpipe is absorbed by the honeycomb structure. A mass of the apparatus ranges from 1 to 25 pounds.

The adsorbent material or the absorbent material for the honeycomb structure is preferably selected from a group comprising zeolitic imidazole frameworks, zeolites, and metal organic frameworks (MOFs).

Yet another aspect of the present invention is a process for CO2 absorption or adsorption to conversion for end-consumer consumable. The process includes attaching a hose between a tailpipe apparatus of a tailpipe of a vehicle and a $CO_2$ removal device or attaching the $CO_2$ tank to the inlet of the device designated for $CO_2$. The process also includes vacuuming the $CO_2$ from the tailpipe apparatus of the vehicle to a $CO_2$ catalyst component of the $CO_2$ removal device. The process also includes transferring water from a water tank of the $CO_2$ removal device to the $CO_2$ catalyst component to mix with the $CO_2$. The process also includes generating a voltage at the $CO_2$ catalyst component to react the water with the $CO_2$. The process also includes converting the $CO_2$ with water to an end-consumer consumable. The process also includes transferring the end-consumer consumable to a consumable tank of the $CO_2$ removal device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
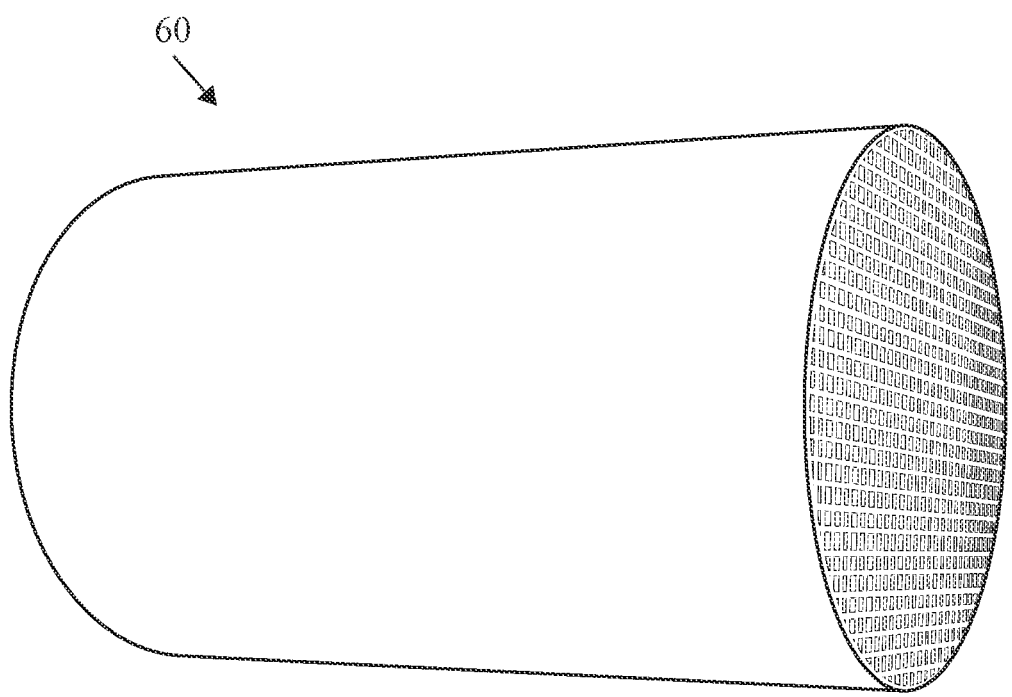
FIG. 1 is an isolated top perspective view of a honeycomb monolith.
Figure 1A:
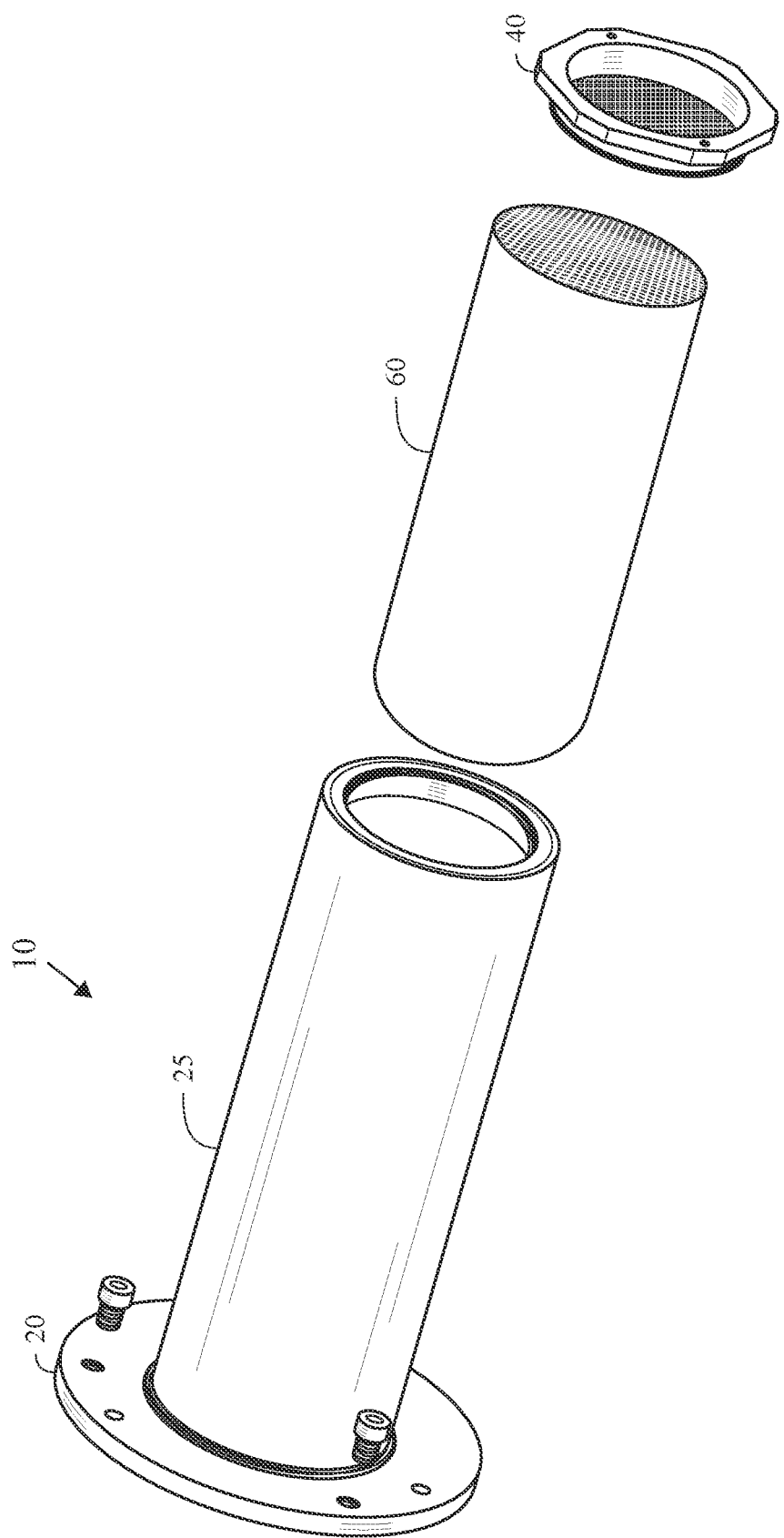
FIG. 1A is an exploded top perspective view of a tailpipe filter apparatus with a honeycomb monolith.
Figure 2A:
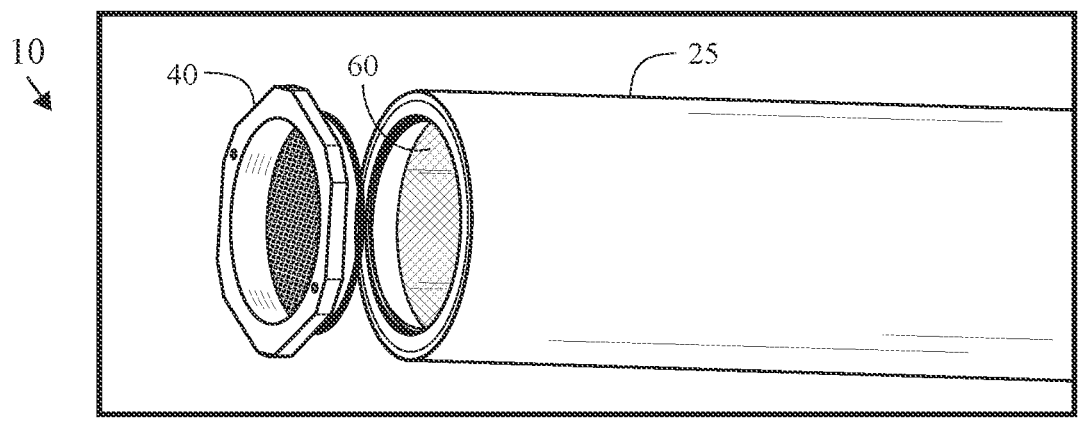
FIG. 2A is an exploded top perspective isolated view of a tailpipe filter apparatus with a honeycomb monolith therein.
Figure 2B:
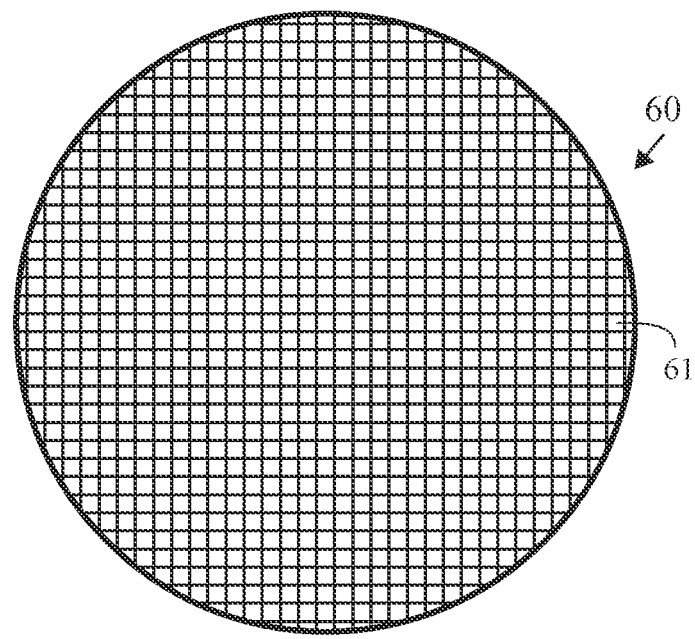
FIG. 2B is an isolated front elevation view of a honeycomb monolith.
Figure 2C:
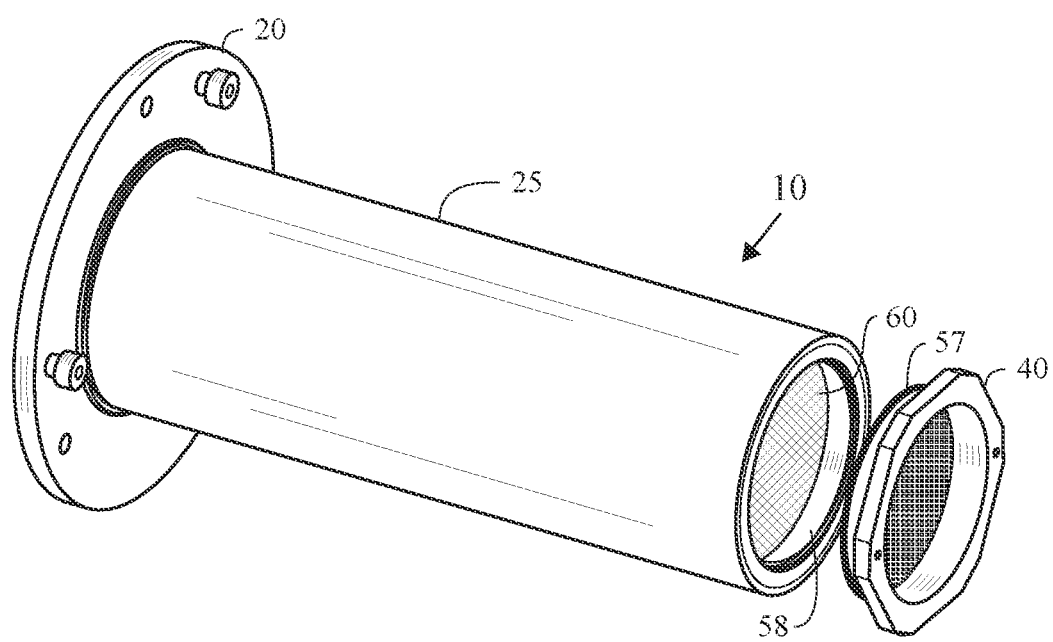
FIG. 2C is an exploded top perspective isolated view of a tailpipe filter apparatus with a honeycomb monolith therein.

FIGS. 1-2C illustrate a preferred embodiment of an apparatus 10 for attachment to a tailpipe of a vehicle. The apparatus 10 preferably comprises a filter body 25, a honeycomb structure 60 and a locking collar. The filter body 25 comprises a front flange 20 with an aperture and an elongated section configured for insertion into the tailpipe. The filter body 25 preferably has a length ranging from 1 to 30 inches, and a diameter preferably ranging from 1 to 5 inches. The honeycomb structure 60 is preferably removably placed within the elongated section of the filter body 25. The honeycomb structure 60 preferably comprises multiple honeycomb cells 61. The honeycomb structure 60 comprises a plurality of spherical sorbents 62 in a stacked steady state. Preferably, each of the honeycomb cells 61 of the honeycomb structure 60 is larger than a spherical sorbent 62 of the plurality of spherical sorbents to provide for insertion and removal from each of the honeycomb cells 61. A threaded removable rear cover 40 that has external threads 57 around an internal perimeter of the removable rear cover 40 that threadingly engage corresponding internal threads 58 of the filter body 25. The locking collar is configured for placement on an exterior of the tailpipe. The filter body 25 is secured to the tailpipe by connection of the front flange to the locking collar. Exhaust from a tailpipe is absorbed by the plurality of spherical sorbents 62 within the honeycomb structure 60. A mass of the apparatus ranges from 1 to 25 pounds.

In an alternative embodiment, the honeycomb structure 60 is composed of an adsorbent material or an absorbent material. The adsorbent material or the absorbent material for the honeycomb structure is preferably selected from a group comprising zeolitic imidazole frameworks, zeolites, and metal organic frameworks (MOFs). Also, in a variation of this embodiment, the honeycomb structure 60 is attached to the rear cover 40 for easier removable from the filter body 25.

In an alternative embodiment, the honeycomb structure 60 integrated with and part of the filter body 25.

The apparatus 10 preferably comprises a filter body 25 with a front flange 20 with an aperture and an elongated section configured for insertion into the tailpipe 5 of a motor vehicle. The apparatus 10 also includes a locking collar 30 that is placed over a tailpipe 5 and engages the front flange 20 for locking the filter body 25 within the tailpipe 5. The apparatus 10 also includes a removable front cover 35 positioned over the aperture of the front flange 20 of the filter body 25. The filter body is preferably attached to the front flange 20 with a band clamp 11.

The front cover 35 is preferably a perforated sheet. The front cover 35 has shoulder bolts for placement within corresponding slots of the front flange 20 for locking the front cover 35 in place over the aperture of the filter body 25 using a twist-lock feature.

The front flange 20 has multiple locking bolts for placement within corresponding slots of the locking collar 30 for locking the front flange 20, with filter body 25, in place around the tailpipe 5 using a twist-lock feature.

The removability of the filter body 25 from the apparatus 10 allows for the replacement of the filter medium of the filter body 25 after use removing exhaust from the tailpipe 5 before the exhaust is emitted into the environment.

FIGS. 3A-3E illustrate an alternative embodiment of an apparatus 10 utilized in a tailpipe with a decorative tip 15 of a gas-powered motor vehicle. In this embodiment, the decorative tip 15 is rectangular in shape. A rectangular cover plate 31 of the apparatus 10 is secured to the decorative tip 15 of the tailpipe of the vehicle using a locking mechanism specific to the decorative tip 15. The cover plate 31 has a locking collar 32 on an interior surface. The filter body 25 is inserted through an access hole of the cover plate 31 and locking bolts of the front flange 20 are placed within corresponding slots of the cover plate 31 and locking collar 32 for securing the filter body 25 with the front flange 20 to the tailpipe using a twist lock mechanism. The front flange 20 preferably has a perforated screen 33 over the aperture of the filter body 25.

Figure 3A:
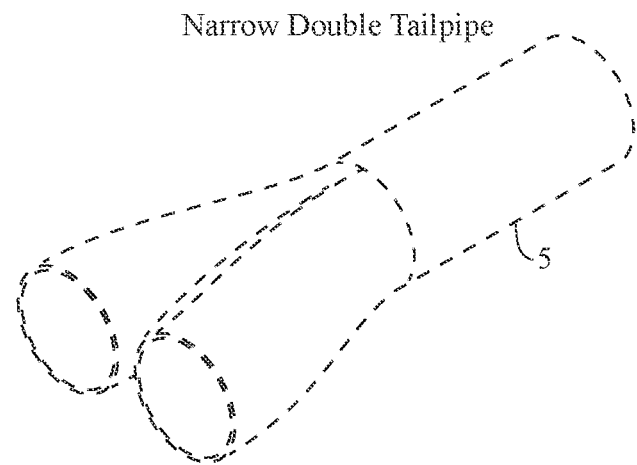
FIG. 3A is a top perspective of a narrow double tailpipe.
Figure 3B:
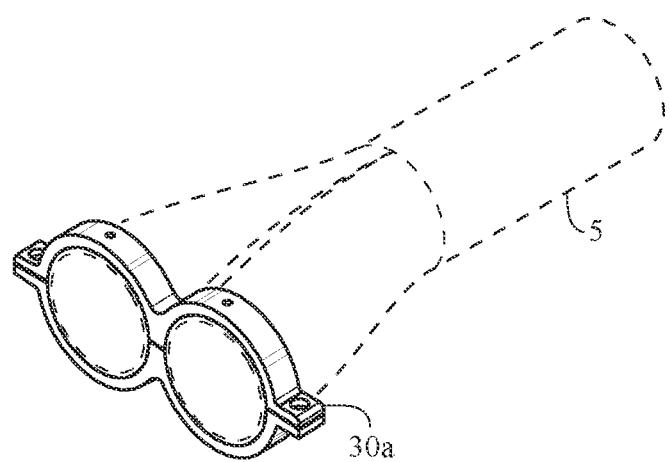
FIG. 3B is a top perspective of an alternative embodiment of tailpipe filter in a narrow double tailpipe.
Figure 3C:
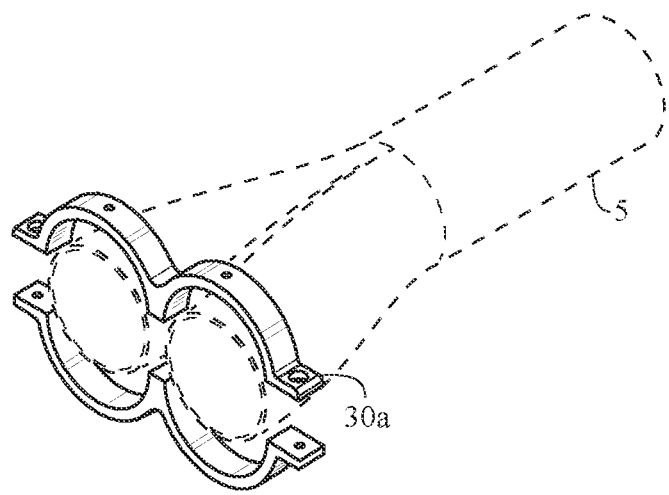
FIG. 3C is a top perspective of an alternative embodiment of tailpipe filter in a narrow double tailpipe.
Figure 3D:
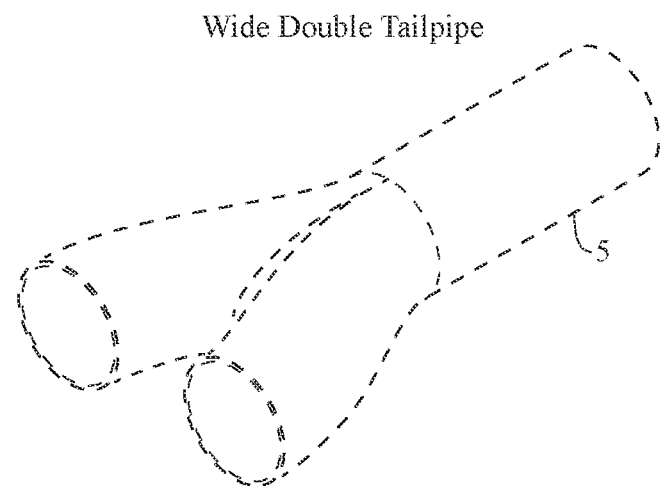
FIG. 3D is a top perspective of a wide double tailpipe.
Figure 3E:
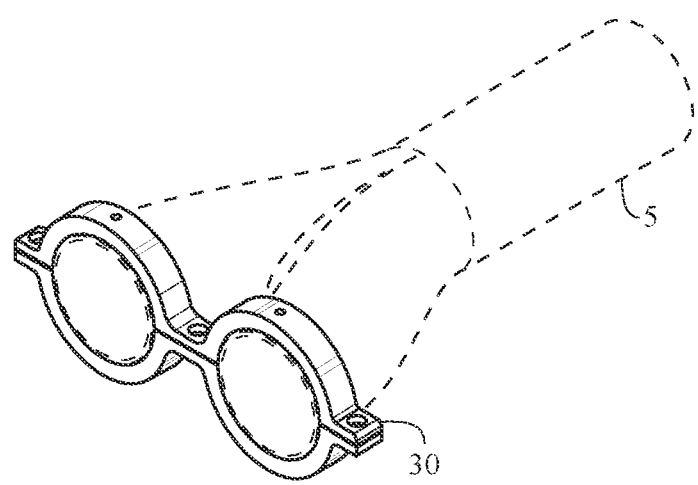
FIG. 3E is a top perspective of an alternative embodiment of tailpipe filter in a wide double tailpipe.

FIGS. 3A-3C illustrate an embodiment for a narrow double tailpipe 5, and FIGS. 3D-3E illustrate an embodiment for a wide double tailpipe 5. In these embodiments, a double locking collar 30a is utilized with two filter bodies 25 (not shown), and attached as described above.

Figure 4A:
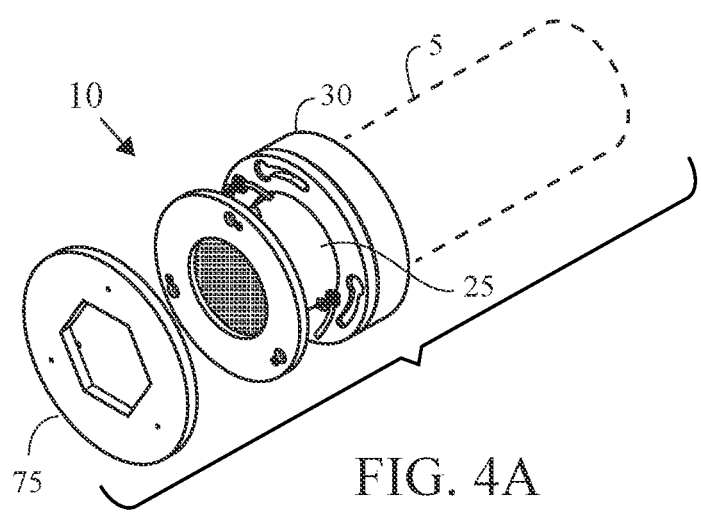
FIG. 4A is a top perspective exploded view of a tailpipe filter.
Figure 4B:
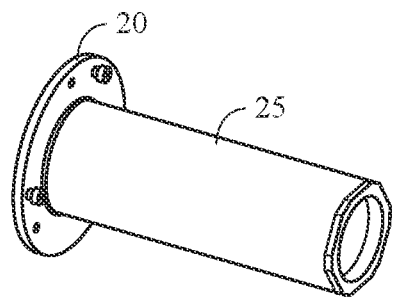
FIG. 4B is a top perspective exploded view of a tailpipe filter.
Figure 4C:
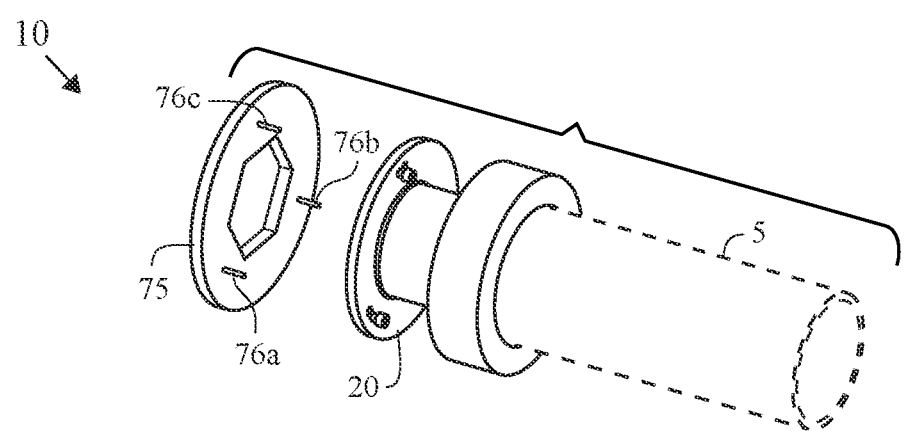
FIG. 4C is a top perspective exploded view of a tailpipe filter.

FIG. 4A-4C illustrate one mechanism for removing the filter body 25 from a tailpipe 5 utilizing an unlocking tool 75. The unlocking tool has pins 76a-76c extending from an internal surface. The pins 76a-76c of the unlocking tool 75 are aligned with holes in the front flange 20. The unlocking tool 75 is pressed against the front flange 20 to depress the spring clips. The unlocking tool is turned counter-clockwise to unlock the filter body 25 from the locking collar 30 using the twist lock mechanism. The filter body 25 is then removed from the tailpipe. The unlocking tool 75 may also have a hexagon shapes aperture for engaging with the rear filter cover 40 (not shown).

Figure 5A:
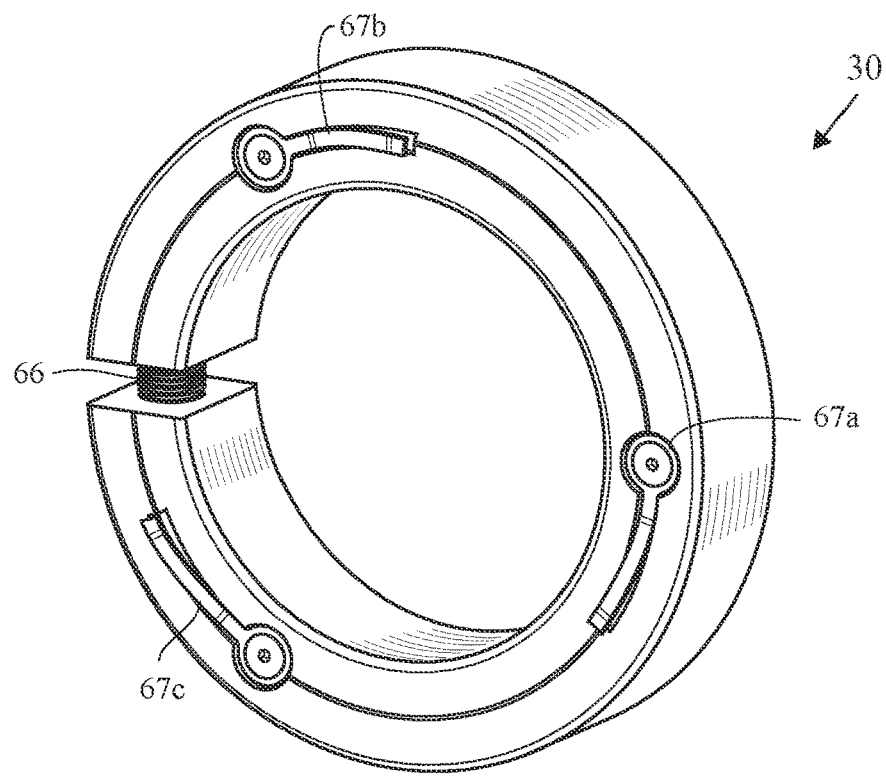
FIG. 5A is an isolated top perspective view of a first embodiment of a collar for a tailpipe filter.
Figure 5B:
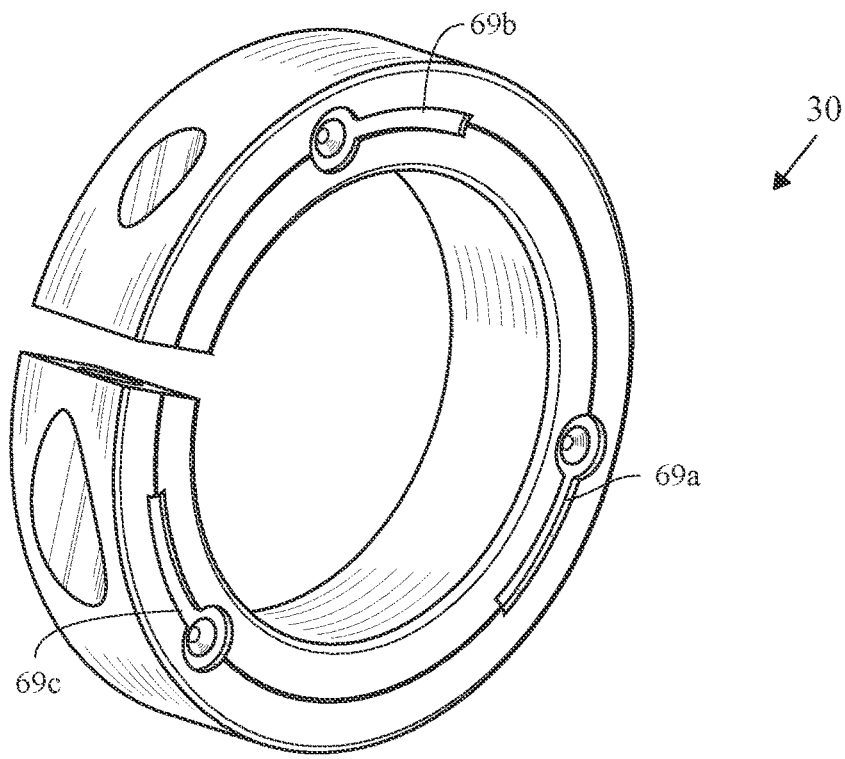
FIG. 5B is an isolated top perspective view of a first embodiment of a collar for a tailpipe filter.

FIGS. 5A and 5B illustrate a locking collar 30. FIG. 5A shows the spring locking clips 67a-c and the clamp screw 66. FIG. 5B shows the twist lock slots 69a-c without the locking clips 67a-c and clamp screw 66 in place.

Figure 6A:
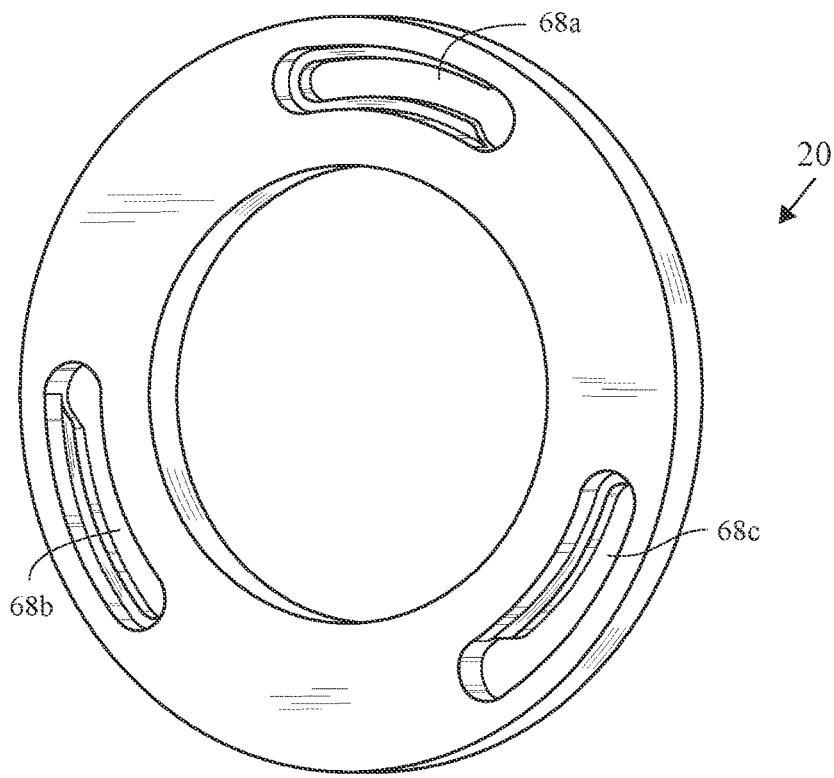
FIG. 6A is an isolated top perspective view of a front filter flange for a tailpipe filter.
Figure 6B:
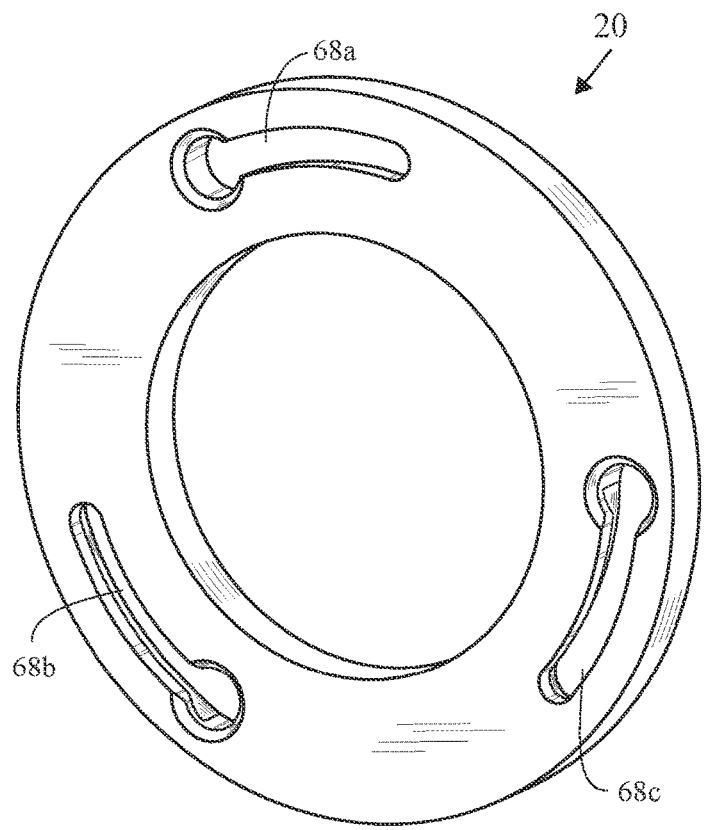
FIG. 6B is an isolated top perspective view of a front filter flange for a tailpipe filter.

FIGS. 6A and 6B illustrate the front side and the back side of a front filter flange 20 with locking clots 68a-c.

Figure 7:
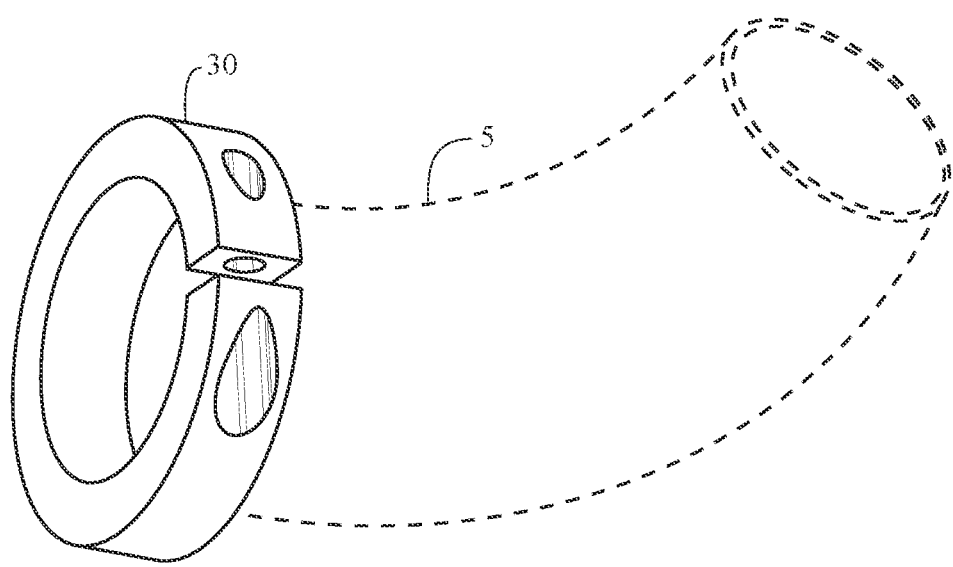
FIG. 7 is an isolated view of a collar positioned over a tailpipe extension.
Figure 8A:
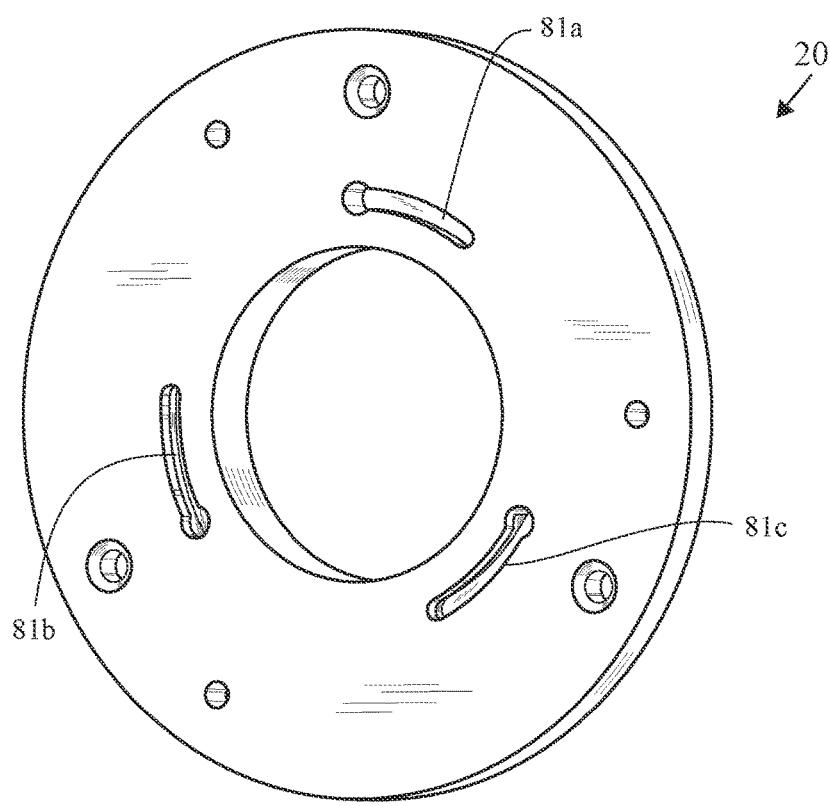
FIG. 8A is an isolated top perspective view of locking flange for a tailpipe filter.
Figure 8B:
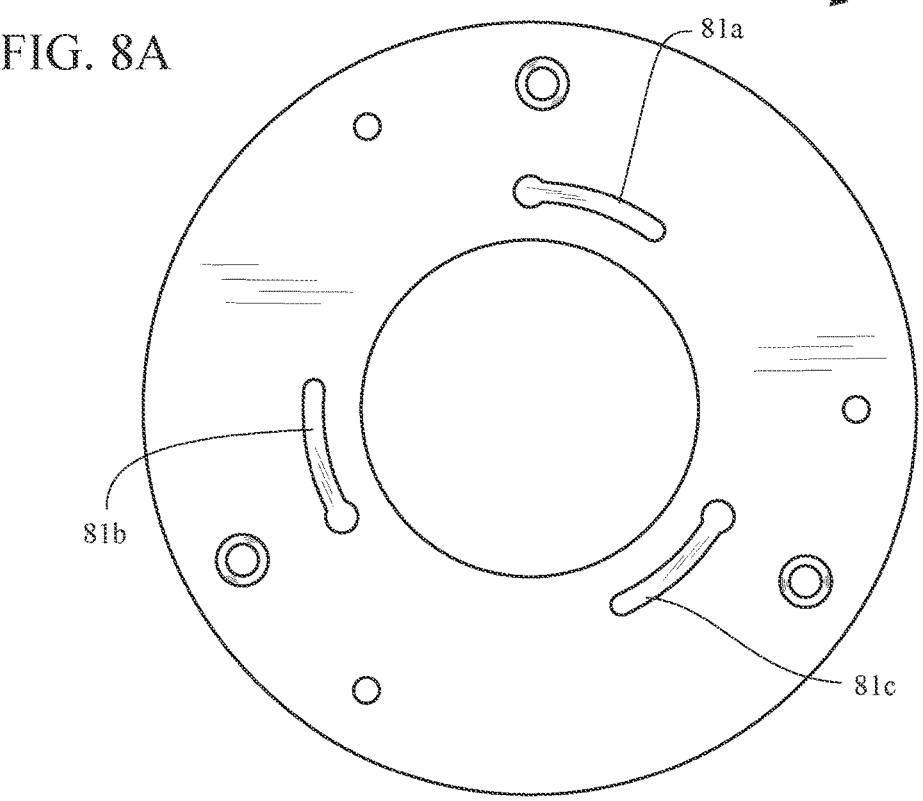
FIG. 8B is an isolated front elevation view of a locking flange for a tailpipe filter.
Figure 8C:
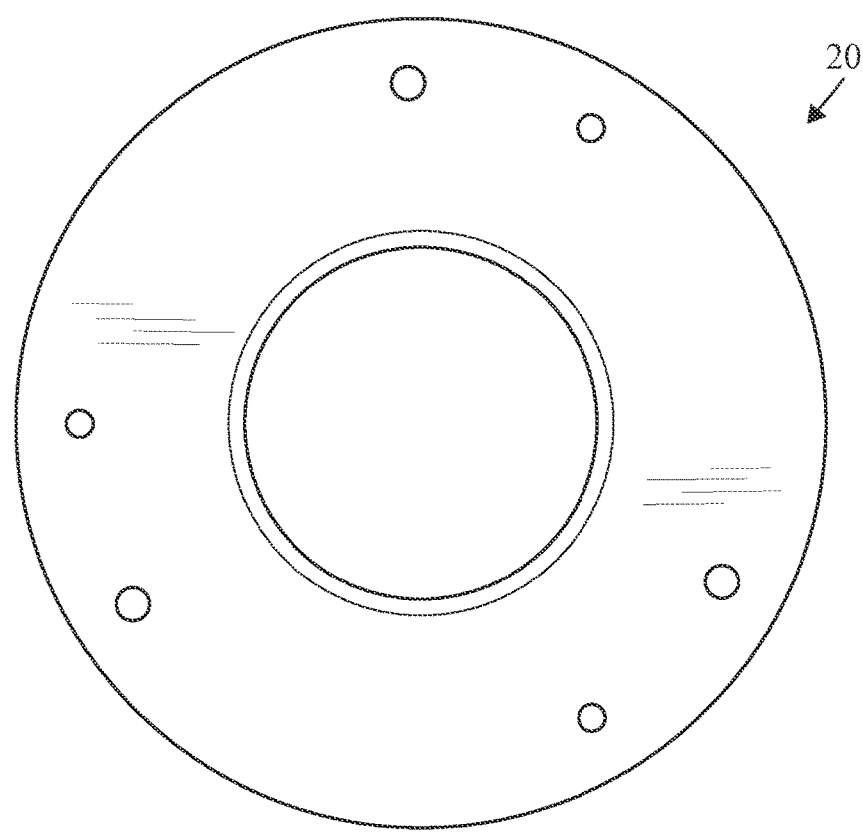
FIG. 8C is an isolated front elevation view of locking flange for a tailpipe filter.
Figure 8D:
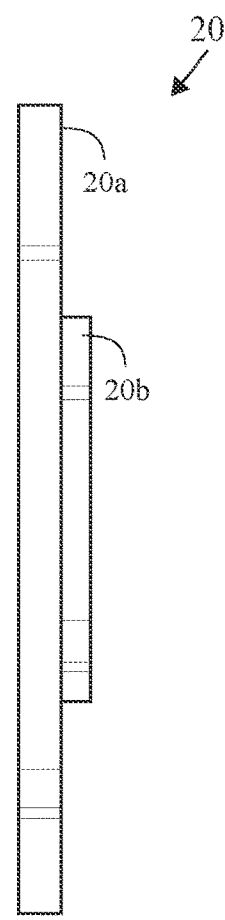
FIG. 8D is an isolated side elevation view of locking flange for a tailpipe filter.

FIG. 7 illustrates the locking collar 30 positioned over a tailpipe 5.

FIGS. 8A-8D illustrate a front locking flange 20 having a main body 20a and a minor body 20b with locking slots 81a-c.

The locking collar 30 preferably has a diameter ranging from 1 to 5 inches.

The apparatus 10 preferably has a mass ranging from 0.5 to 25 pounds, and most preferably 1 to 25 pounds.

The filter body 25 is preferably composed of an aluminum material, a steel material, stainless steel, or any material deemed eligible for this application. The filter body 25 preferably has a thickness ranging from 0.1 to 0.5 inch, and most preferably 0.125 to 0.25 inch. The filter body preferably has a length ranging from 1 to 30 inches, and most preferably 4 to 12 inches. The filter body preferably has a diameter of 1 to 5 inches, and most preferably 2 to 4 inches.

The filter medium preferably comprises of any materials that are deemed by the scientific community as sorbents that are capable of absorbing exhaust gases (such as carbon dioxide, nitrogen oxides, carbon monoxide, sulfur dioxide, particulate matter, or other hydrocarbons), such as: zeolitic imidazole frameworks, zeolites, metal organic frameworks (MOFs), other hybrid ultraporous materials, membranes, adsorption focused materials, other natural sorbents or adsorbents. Any salt containing: Li, Na, K, Cs, Rb, Fr, Ca, Mg, Be, Sr and Ba. Salts considered for this applications correspond to any alkali and alkaline earth element and: OH(−), NO3(−), SO3(−), SO4(2−), CO3(2−), CN(−), PO3 (2−), CH3COO(−), PO4(3−), HPO4(2−), H2PO4(−), HCO3 (−) and S(2−).

Figure 9:
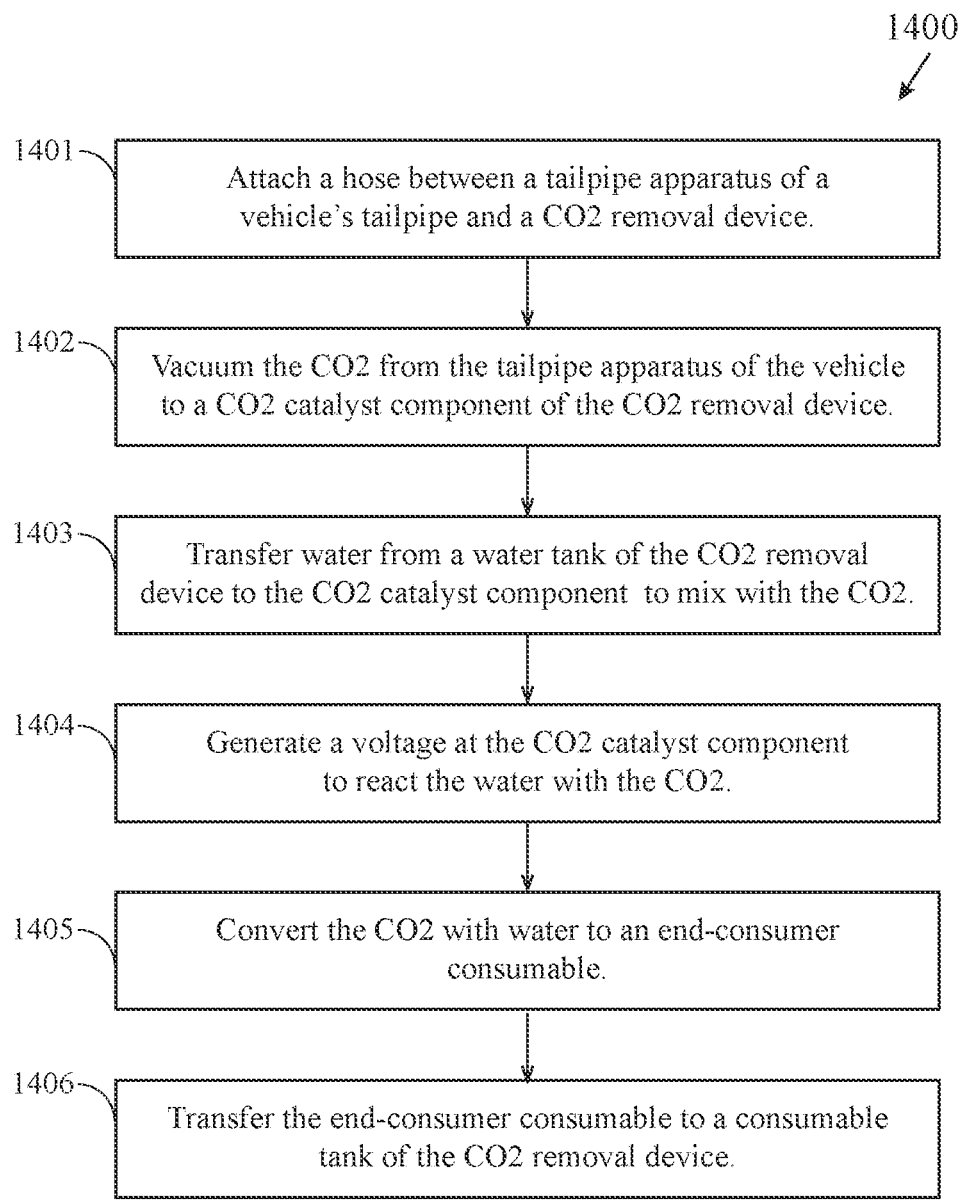
FIG. 9 is a flow chart of a method for $CO_2$ sorption to conversion for end-consumer consumable.

As shown in FIG. 9, a method for $CO_2$ absorption to conversion for end-consumer consumable is generally designated 1400. At block 1401, a hose is attached between a tailpipe apparatus of a tailpipe of a vehicle and a $CO_2$ removal device. At block 1402, the $CO_2$ is vacuumed from the tailpipe apparatus of the vehicle to a CO2 catalyst component of the $CO_2$ removal device. At block 1403, water is transferred from a water tank of the $CO_2$ removal device to the $CO_2$ catalyst component to mix with the $CO_2$. At block 1404, a voltage is generated at the CO2 catalyst component to react the water with the $CO_2$. At block 1405, the CO2 with the water is converted to an end-consumer consumable. At block 1406, the end-consumer consumable is transferred to a consumable tank of the $CO_2$ removal device.

Figure 10:
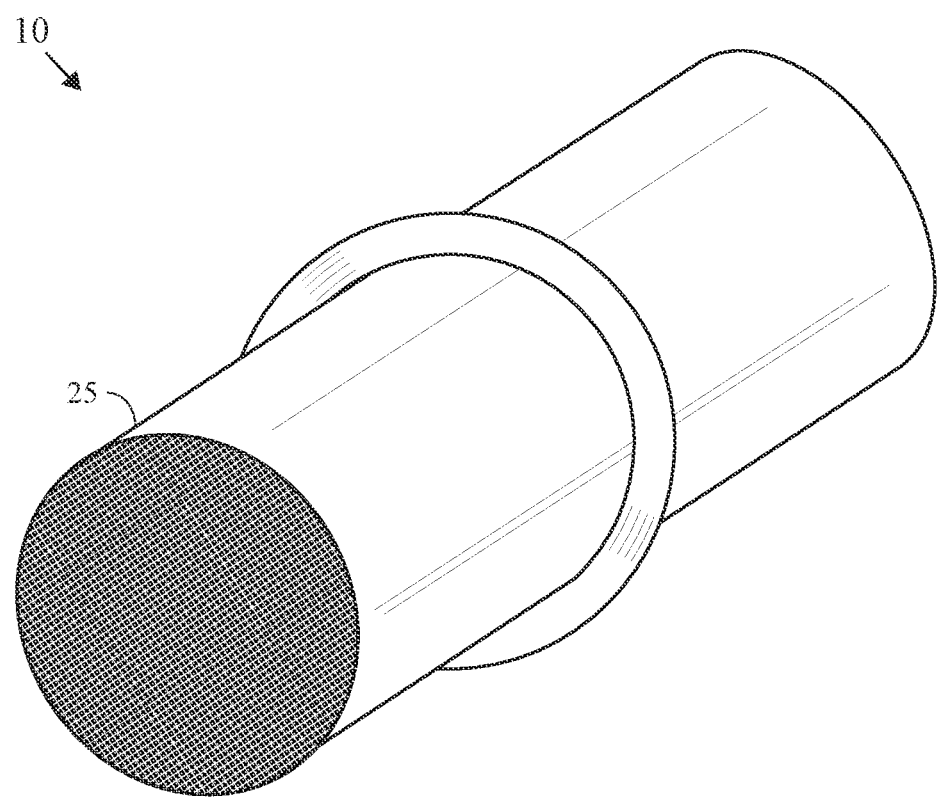
FIG. 10 is a top perspective view of an alternative embodiment of a tailpipe filter.

FIG. 10 illustrates an alternative embodiment of a filter body 25.

Figure 11:
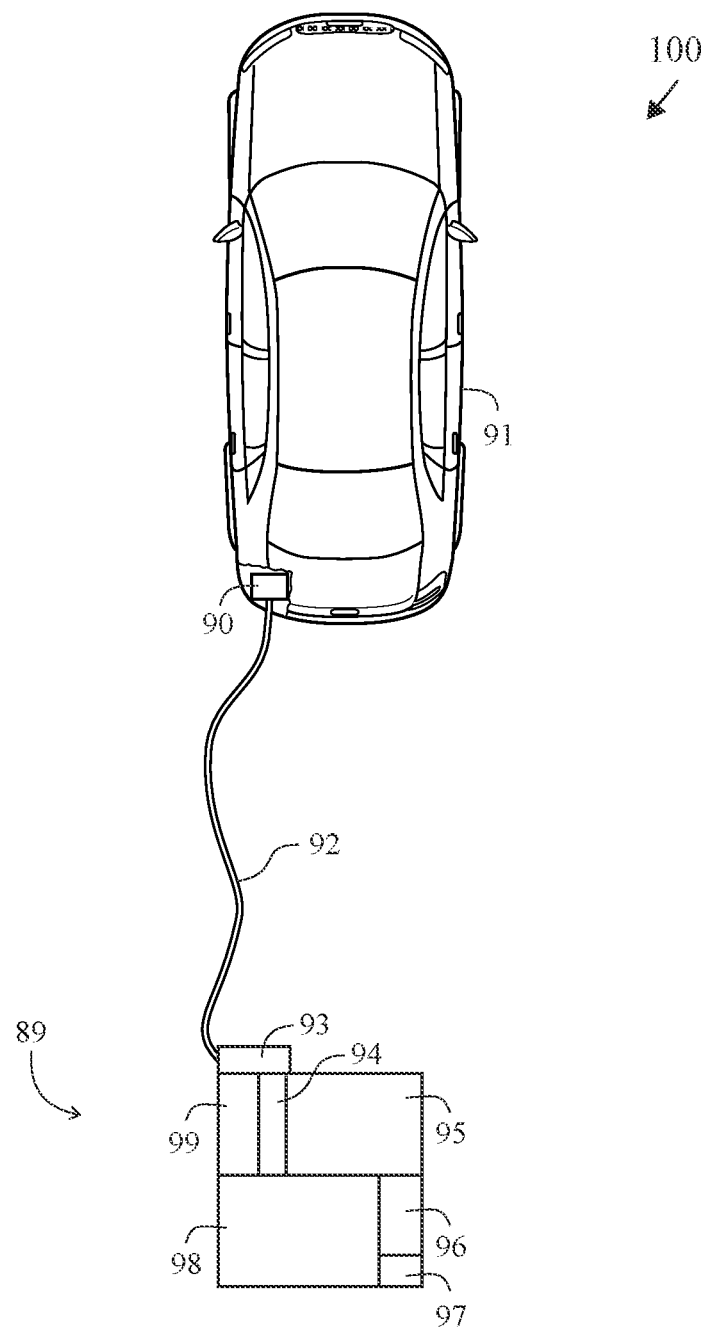
FIG. 11 is a block diagram of a vehicle and $CO_2$ storage conversion device.

FIG. 11 illustrates a block diagram for a $CO_2$ conversion system 100. The system comprises a vehicle 91, a $CO_2$ removal device 89 and a hose 92 for connection between a $CO_2$ tank tip 90 of the vehicle 91 and the $CO_2$ removal device 89. The $CO_2$ removal device 89 preferably comprises a consumable tank 98, a hose storage 93, a vacuum and other components (electrical outlet) module 94, a water tank 95, a control panel 96, an electrical inlet 97, and a $CO_2$ catalyst 99. The water tank 95 is preferably removable, however in an alternative embodiment it is stationary/fixed. The vacuum component preferably serves three purposes: to transfer the $CO_2$ from the vehicle to the $CO_2$ catalyst 99; to transfer water from the water tank 95 to the $CO_2$ catalyst 99; and to provide voltage to the $CO_2$ catalyst 99. The consumable tank 98 is preferably fully removable or alternatively, partially removable (so that it isn't carrying all of the consumable material, and only some of it is transferred to the removable section). The $CO_2$ removal device 89 is preferably on wheels. In an alternative embodiment, the hose 92 and hose storage 93 are replaced with an inlet to allow $CO_2$ from a $CO_2$ tank to be disposed into the $CO_2$ removal device 89.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim:

1. A process for $CO_2$ absorption or adsorption to conversion for end-consumer consumable, the process comprising:
   making a connection between a tailpipe apparatus of a tailpipe of a vehicle and a $CO_2$ removal device by attaching an inlet to allow for a $CO_2$ tank to dispose of its $CO_2$ into a $CO_2$ catalyst component of the $CO_2$ removal device;
   vacuuming the $CO_2$ from the tailpipe apparatus of the vehicle to the $CO_2$ catalyst component of the $CO_2$ removal device;
   transferring water from a water tank of the $CO_2$ removal device to the $CO_2$ catalyst component to mix with the $CO_2$;
   generating a voltage at the $CO_2$ catalyst component to react the water with the $CO_2$;
   converting the $CO_2$ with water to an end-consumer consumable; and
   transferring the end-consumer consumable to a consumable tank of the $CO_2$ removal device.

2. The process according to claim 1 wherein converting the stripped $CO_2$ to an end-consumer consumable comprises converting, via an electrochemical process, the stripped $CO_2$ to an alcohol, an alkene, an aromatic, a hydrocarbon, or an alkane.

* * * * *